Patented Aug. 11, 1936

2,050,540

UNITED STATES PATENT OFFICE 2,050,540

OPHTHALMIC LENS

Harold R. Moulton, Sturbridge, Mass., assignor to American Optical Company, Southbridge, Mass., a voluntary association of Massachusetts No Drawing. Application October 28, 1933, Serial No. 695,669

3 Claims. (Cl. 41—20)

This invention relates to improvements in glass articles and has particular reference to a glass article having an identification or other mark thereon, normally invisible, but visible on the application of moisture thereto, and to an improved process of making the same.

One of the principal objects of the present invention is to provide, as a novel article of manufacture, a glass article which is provided with a more or less permanent and normally invisible identification mark or designation which will not be removed or impaired by the ordinary cleaning to which such articles are subjected, and yet which may be readily rendered visible for the purpose of designating the quality and genuineness of said article, etc.

Another object is to provide a glass lens having a mark or designation which is normally invisible, but which will become visible upon condensation of moisture thereon.

Another object is to provide a glass article having a mark or designation which is normally invisible, but which will become visible on the application thereto of a suitable developing compound.

Another object is to provide a glass article having a mark or designation wherein the wiping off or removal of the visible portion of the mark will not affect the invisible portion.

Another object is the provision of a novel and improved art or process of producing these marks or designations on glass articles.

A further object is to provide such an improved art or process of the character stated which is composed of a minimum number of operations and the application of which is extremely simple.

Other objects and advantages of the invention should become apparent by reference to the following specifications, and it is to be understood that modifications in the structure or steps of the process hereinafter described may be made without departing from the scope of the appended claims or without departing from or exceeding the spirit of the invention, the preferred structure and steps of the process being described only by way of illustration.

In the manufacture of glass ophthalmic lenses there are many different grades and types of lenses, depending on the manufacturer producing the same, the accuracy and processes of manufacture, and the particular type of lens involved. There are on the market certain ophthalmic lenses of very high grade and type, while at the same time there are also on the market numerous imitations of a much inferior quality. As ophthalmic lenses are designed to be worn on the face and employed for visual purposes, it has always been a problem to so mark or designate the lens that the purchaser could be sure of the grade and quality of product, the name of the manufacturer or the like, since any such designation if applied to the lens would be either temporary or liable to be removed during the necessary cleaning before delivery of the lens to the patient, or if attempted to be permanently applied, would be of a visible character tending to interfere with the vision or with the appearance of the mounting so as to cause the same to be refused by the purchaser.

It, therefore, is one of the primary objects of the present invention to provide a marking or designation which will be more or less permanent and normally invisible and of such a nature as to not affect the optical properties of the lens and which may be rendered visible when breathed upon, or by the application of a physical developer.

In carrying out the invention the lens is first constructed from ordinary crown or flint glass, or a suitable combination of both, by surfacing the glass in the usual manner on either one or both faces thereof, as may be preferred.

After a lens has been finally finished on at least one surface, it is in condition for the carrying out of the process which consists in applying to the finished surface of the lens either by a pen, brush, rubber stamp, pencil, or other desired manner, suitable markings or designations such as a trade-mark, name of the manufacturer, or the like. Although it has been found that several different substances may be employed for this purpose, the formula preferred and given here as an example of one which has been found to be very satisfactory comprises:

| | Per cent |
|---|---|
| Hydrofluosilicic acid | 4.5 |
| Stannous chloride | 0.25 |
| Precipitated barium sulphate | 43.25 |
| Water | 52 |

These materials after having been mixed to form a solution of the desired consistency are applied to the lens surface and left there as long as is desired, preferably until dry. This solution is more or less visible on the lens surface until it is removed either by washing or otherwise, or by the usual cleansing or wiping of the lens surface prior to the wrapping or packaging thereof. This removal of the visible solution on the surface of the lens may be very quickly and easily accomplished without injuring the invisible marking.

Each of the materials of the solution has a definite purpose and cooperative nature for producing what is believed to be a new and novel process of applying a mark or designation on a glass article.

The stannous chloride is used preferably because of its penetrating nature which when it is applied to a glass surface will penetrate said surface and deposit a decomposition product in the glass. This decomposition product is of such a nature as to be normally invisible under ordinary service conditions, but when breathed upon or treated with a suitable physical developer will be clearly visible. In the use of stannous chloride for marking lenses, it has been found that a mark or designation of this nature when formed on a mechanically polished or fire glazed glass surface, will only be visible for a limited amount of time, that is, the decomposition product thereof will soon depart and become invisible. This is due primarily to the fact that the mechanically polished or fire glazed surface forms a shell or surface on the lens which retards the penetrating action of the stannous chloride and permits only a very limited amount thereof to be deposited in the lens. Applicant, therefore, to increase the penetrating action of the stannous chloride, has added to the solution a certain percentage of hydrofluosilicic acid. This acid dissolves superficially the mechanically polished or fire glazed surface and thereby greatly increases the penetrating action of the stannous chloride. Attention is directed to the fact that the concentration of the hydrofluosilicic acid used must be sufficiently high to remove this superficial polished layer or shell on the lens to such an extent as to allow the stannous chloride to penetrate and yet not dissolve so much as to render the mark optically demonstrable by ordinary optical means such as is commonly used by lens examiners. The percentage, therefore, of the hydrofluosilicic acid must be more or less carefully adhered to so as to produce the result desired. It might be well to include that although the hydrofluosilicic acid superficially dissolves the shell formed by the mechanical polishing or fire glaze, it in itself produces a smoothly polished surface, but which is of a different nature than the mechanically polished or fire glazed surface, that is, different in texture and possibly in the arrangement of the surface molecules of the glass.

The precipitated barium sulphate is merely added as a loading agent for the solution to permit a more clean cut stamping and also to permit ease in the removal of the dried mark.

The solution formed in the above manner provides means whereby a much more permanent marking may be obtained. The lenses or articles thus produced may be subjected to indefinite washing, wiping or other cleaning action, without impairing the visibility of the designation mark. The mark or designation is of such an invisible nature that it is not perceptible under the commonly known optical tests but may readily be rendered visible by breathing thereon or by the use of a physical or chemical developer. The solutions of such developers may be made in the following manner:

*Solution A*

| | | |
|---|---|---|
| Elon | grams | 5 |
| Citric acid | do | 10 |
| Acetic acid | do | 25 |
| Water | c. c. | 500 |

*Solution B*

| | | |
|---|---|---|
| Silver nitrate | grams | 50 |
| Water | c. c. | 500 |

Equal parts of the above solutions A and B may be used at 75 degrees Fahrenheit. Attention is directed to the fact that these solutions will not injure the lens surface and are easily removable by means harmless to the glass surface.

Other solvent agents such as hydrofluoric acid may be used instead of the hydrofluosilicic acid to dissolve the shell of the mechanically polished or fire glazed surface but such acids tend to produce a matte surface which affects the optical properties of the lens. The hydrofluosilicic acid does not produce a matte surface, it merely dissolves the mechanically polished or fire glazed surface to such an extent as to change the texture or bring about a difference in the arrangement of the surface molecules of the glass to enable the stannous chloride acid to penetrate more deeply into the particles of glass so that a greater amount of the decomposition product of said acid will remain in the glass and, therefore, will be more permanent. The hydrofluosilicic acid in itself will produce a smoothly polished surface which will have no injurious effect upon the optical properties of the lens or glass.

The main solutions, therefore, which enable the forming of a much more permanent mark or designation on the article, and which is the basis of this invention, is the combination of hydrofluosilicic acid of approximately 4.5% used primarily to dissolve superficially the polished or fire glazed surface, and stannous chloride of approximately 0.25% which will penetrate said dissolved surface to such a depth as to cause a greater amount of the decomposition product of said acid to remain in the article, the barium sulphate being used primarily as a loading agent for the solution to permit a more clean cut stamping and easy removal of the dried mark. This combination of materials produces a much more efficient and permanent mark than has been usual in the past and is such that it will not in any way affect the optical properties of the lens or article on which it is placed or cause the same to be refused by the purchaser.

From the foregoing description it will be seen that simple, efficient and economical means and process has been provided for producing an improved article having a more permanent and efficient designation or marking thereon.

Having described my invention I claim:

1. The process of changing a glass surface so that it will have a different reaction to vapor comprising applying to said surface a solution containing hydrofluosilicic acid and stannous chloride.

2. The process of changing a glass surface so that it will have a different reaction to vapor than it ordinarily had comprising applying thereto a solution of hydrofluosilicic acid and stannous chloride to form a visible coating and subsequently removing said visible coating without changing the reaction qualities of said glass.

3. The process of changing a glass surface so that it will have a different reaction to vapor comprising applying hydrofluosilicic acid to said surface to superficially dissolve a portion thereof and simultaneously applying to said dissolved surface a solution of stannous chloride.

HAROLD R. MOULTON.